United States Patent [19]

Thomas et al.

[11] Patent Number: 4,533,118

[45] Date of Patent: Aug. 6, 1985

[54] STRIPPER ASSEMBLY FOR REMOVING CARPET

[76] Inventors: Philip D. Thomas; Harvel W. Thomas, both of 10471 SW. 40 Ter., both of Miami, Fla. 33165

[21] Appl. No.: 505,298

[22] Filed: Jun. 17, 1983

[51] Int. Cl.[3] .......................... B66D 1/00; B32B 1/00

[52] U.S. Cl. .................................... 254/202; 156/344; 156/584; 254/332

[58] Field of Search ............... 254/202, 211, 212, 208, 254/224, 227, 213, 200, 262, 332, 209, 216, 217, 218, 255; 156/344, 247, 584, 98; 294/8.6, 132, 133, 135, 104; 24/DIG. 22; 16/5, 6, 17; 223/96; 38/102.7, 102.91

[56] References Cited

U.S. PATENT DOCUMENTS

| | | | |
|---|---|---|---|
| 21,303 | 8/1858 | Ridley | 254/202 |
| 195,026 | 9/1877 | La Rue | 254/255 |
| 256,838 | 4/1882 | Henderson | 254/202 |
| 407,377 | 7/1889 | Sneden | 254/208 |
| 4,217,071 | 8/1980 | Ault | 294/104 X |
| 4,332,371 | 6/1982 | Bell et al. | 254/334 X |

FOREIGN PATENT DOCUMENTS

| | | | |
|---|---|---|---|
| 2024759 | 1/1980 | United Kingdom | 254/332 |

*Primary Examiner*—Stuart S. Levy

*Assistant Examiner*—Katherine Jaekel

*Attorney, Agent, or Firm*—John Cyril Malloy

[57] ABSTRACT

An assembly designed to strip carpet or like floor covering from the surface of a floor to which it is directly adhered as by adhesive or the like wherein a gripping jaw is affixed to a carpet portion to be stripped and interconnected to an anchored driving assembly in the form of a winch and interconnecting cable. Activation of the winch causes a pulling force exerted on the gripping jaw and steadily pulls and thereby strips the carpet from the surface to which it was adhered.

14 Claims, 10 Drawing Figures

STRIPPER ASSEMBLY FOR REMOVING CARPET

BACKGROUND OF THE INVENTION

1. Field of the Invention

This invention relates to a structural assembly designed to remove carpet from a floor or like surface wherein the carpet is of the type adhered or affixed directly to the floor surface by adhesive or like means.

2. Description of the Prior Art

In large industrial and commercial complexes, where carpet is used as the primary floor covering over generally very large floor areas, it is common practice to adhere or affix the undersurface of the carpet directly to the exposed surface of the floor being covered. This is usually done by glue, adhesive or like material distributed substantially over the entire surface to be covered. This type of installation is considered necessary in high traffic areas.

While the above type installation is effective for maintaining carpet for long periods of time, it has been realized that the removal of this directly adhered carpet from the flooring surface, once it is worn or needs replacement, is extremely difficult. The problem in removing such adhered carpet comes from separating the directly adhered undersurface of the carpet from the flooring. Prior art attempts to accomplish such removal are still extremely time-consuming and manually very difficult. Accordingly, problems arise in finding laborers willing to perform such difficult tasks. Therefore, it is readily seen that problems existing in the removal of directly adhered carpet from a flooring surface is expensive, time-consuming, extremely difficult and presents a serious problem in the industry.

In order to overcome such problems, prior art devices have been developed wherein machines serve to cut or chip away at the point of contact between the carpet and the flooring. Such prior art machines do not supply direct force to the carpet in and of themselves but attempt to weaken the bond between the undersurface of the carpet and the flooring. In utilizing such existing and commercially available machines, extreme manual exertion is still required in providing force for the actual removal. Therefore, while this type of machine is certainly operable, its use does not overcome many disadvantages associated with the removal of such carpet as set forth above.

Accordingly, there is a need in the industry for a device which will cause the efficient and relatively easy removal or stripping of such carpet from floor surfaces to which they are directly adhered. Ideally, such an assembly should require a minimal amount of additional workers and preferably carpet portions can be stripped from flooring surfaces by a single operator in a working period which is much less than applying prior art methods of removal.

SUMMARY OF THE INVENTION

The present invention is directed towards a stripper assembly of the type primarily designed to remove or strip carpet from a flooring surface to which it is directly adhered. Fixing the carpet to the floor surface is generally accomplished by relatively strong, commercial grade glue or adhesives. Such adhesive material is specifically designed to maintain carpets in a fixed, covered position over large surface areas of flooring for extended periods and during adverse or heavy traffic conditions. Therefore, the subject stipper assembly is designed to easily and efficiently remove or strip such carpeting when it is desired to be replaced in a manner which overcomes problems previously existing in the prior art.

The stripper assembly of the present invention comprises a gripping means in the form of a gripping jaw assembly having pivotally connected jaw elements movably positioned between an opened and a closed position. Grasping means are mounted on the interior surface of the cooperating jaw elements and are specifically structured to firmly grasp and/or penetrate a portion of the carpet to be stripped. Locking means are affixed to the jaw elements such that the jaw assembly can be locked or maintained in a closed position wherein the carpet to be stripped is securely grasped therebetween.

A driving means, preferably in the form of a motor driven winch is interconnected to the gripping jaw assembly by a cable. The cable is secured at one end to the winch and wound about the winch drum. The opposite end is secured to the rear portion of the gripping jaw assembly. Upon activation of the winch motor, rotation of the drum causes the interconnecting cable to be wound thereabout applying sufficient force to the gripping jaw assembly and the carpet portion maintained therebetween. The carpet is thereby removed or stripped from the flooring surface.

The stripper assembly of the present invention further comprises an anchor means attached to the driving means in a manner which mains or secures the driving means in a predetermined location and thereby provides resisting force to the pulling force required to remove the carpet from the floor. In a preferred embodiment to be described hereinafter, the anchor means comprises an anchor jaw assembly structured identical to and/or substantially similar to the gripping jaw assembly. When utilized, the anchor jaw assembly is secured to an adjacent carpet portion about the edge thereof. The edge of the "anchoring carpet portion" is secured between the jaw elements of the anchor jaw assembly and the latter is locked into its closed gripping position. Since the anchoring carpet portion is also, normally adhered to the floor on which it is mounted, sufficient resistance is thereby provided to secure the winding means in place when activation of the winch occures and proper pulling force is exerted on the carpet being stripped.

It should be noted that other anchoring means can be secured or attached to the driving means and structured to provide resistance and maintain the position thereof without resort to the anchor jaw structure.

Further structural features include the pivotal movement of the driving means relative to its maintained and anchored position in order to compensate for the exact angle at which pulling force is exerted on the carpet portion being stripped.

BRIEF DESCRIPTION OF THE DRAWINGS

For a fuller understanding of the nature of the present invention, reference should be had to the following detailed description taken in connection with the accompanying drawings, in which.

Similar reference characters refer to similar parts throughout the several views of the drawings.

DETAILED DESCRIPTION OF THE PREFERRED EMBODIMENT

Figure 1:
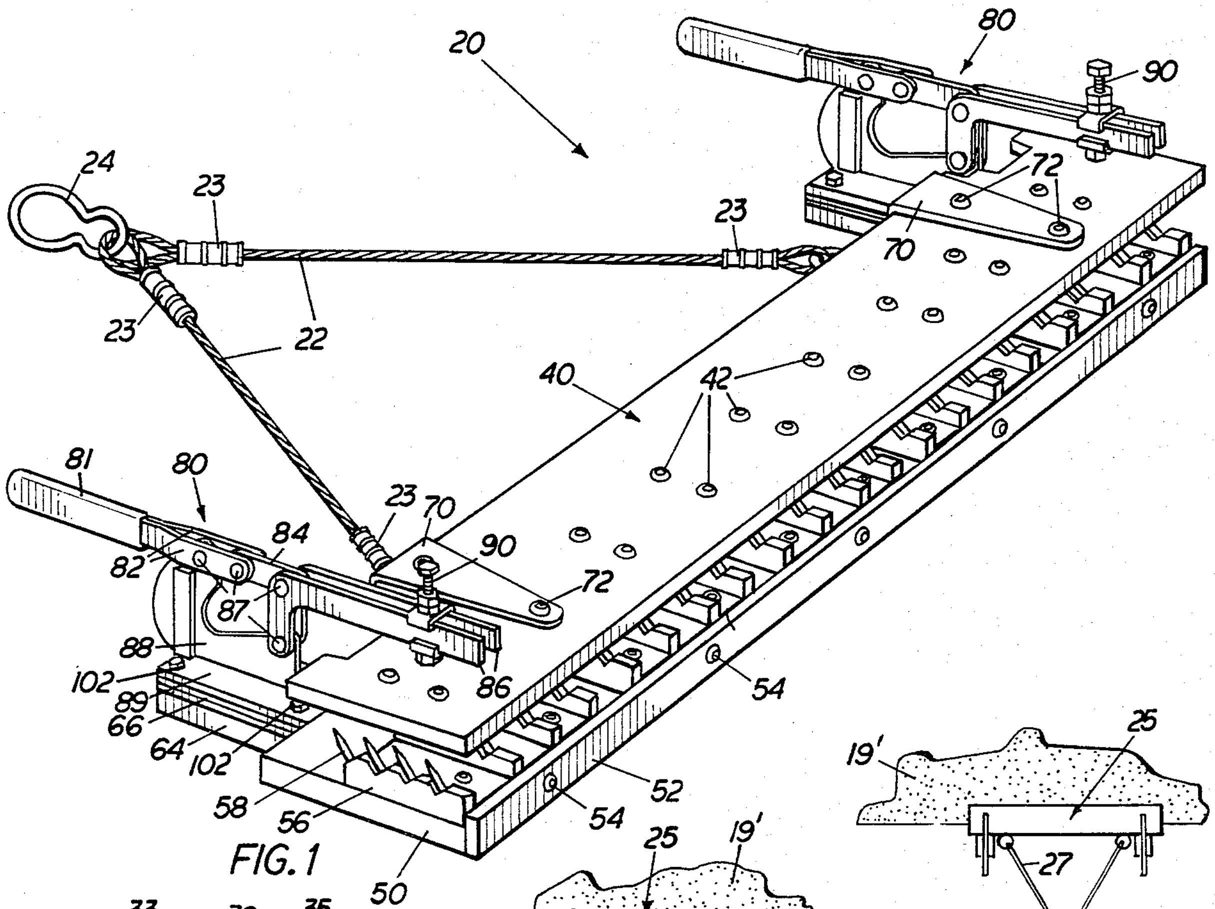
FIG. 1 is an isometric view of the gripping jaw assembly of the present invention.
Figure 2:
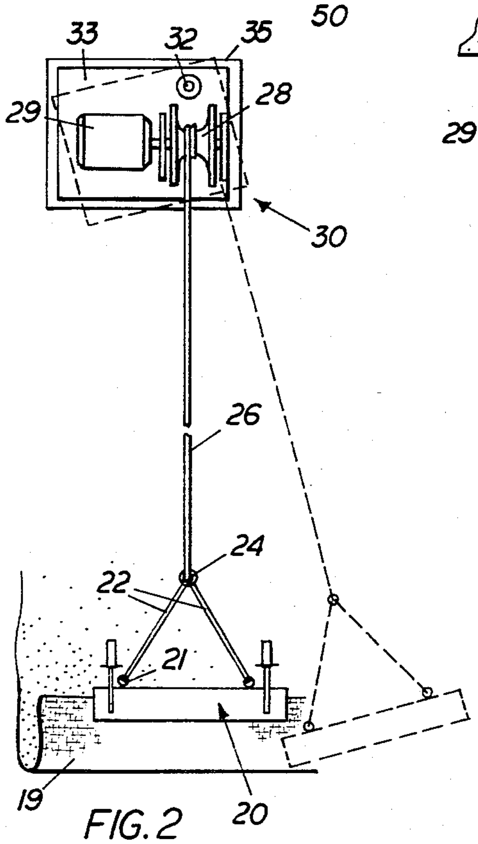
FIG. 2 is a top plan view of the driving and gripping portions of the present assembly with slight reorientation of the assembly shown in broken lines.
Figure 3:
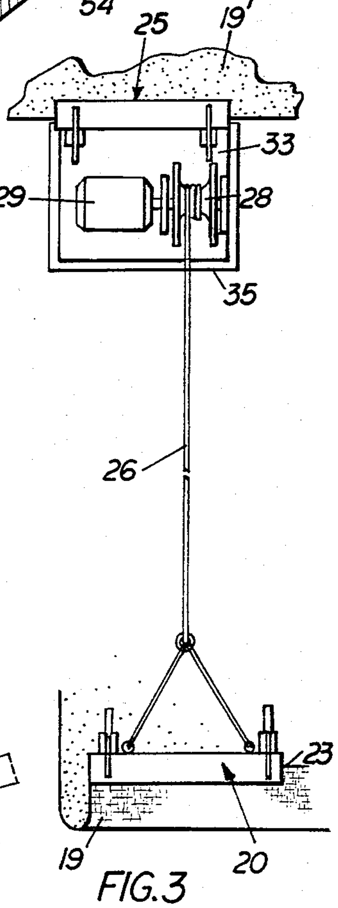
FIG. 3 is a top plan view of the assembly of the present invention showing one embodiment of the anchor structure thereof.
Figure 4:
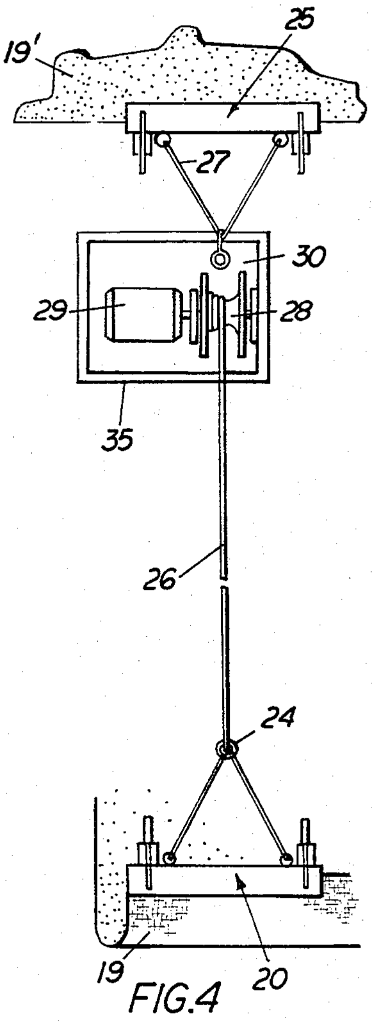
FIG. 4 is a top plan view of the stripper assembly of the present invention showing yet another embodiment of the anchor structure thereof.

As best shown in FIGS. 2, 3 and 4, the stripper assembly of the present invention comprises a gripping means generally indicated as 20 and specifically structured to securely engage an edge portion 23 of a carpet to be removed or stripped from a flooring surface. This gripping means 20 is attached by an interconnecting means 26 in the form of a cable to a driving means generally indicated as 30. In the preferred embodiment, this driving means comprises a winch assembly including a winch drum 28 rotatably driven by an electric motor or the like upon activation. The winch assembly is securely attached to a support platform 33 which in turn is pivotally mounted on an anchor platform 35. The anchor platform is structured to rest on the upper surface of the carpet being stripped or immediately adjacent thereto.

Anchor means generally indicated as 25 is attached to the anchor platform 35 either directly thereto as shown in FIG. 3 or otherwise connected as shown in FIG. 4. It is important to note that the anchor means 25, as will be described in greater detail hereinafter, may be in the form of an anchor jaw assembly wherein the jaw structure of the jaw assembly duplicates the gripping jaw assembly defining or comprising a major portion of the gripping means 20.

Figure 5:
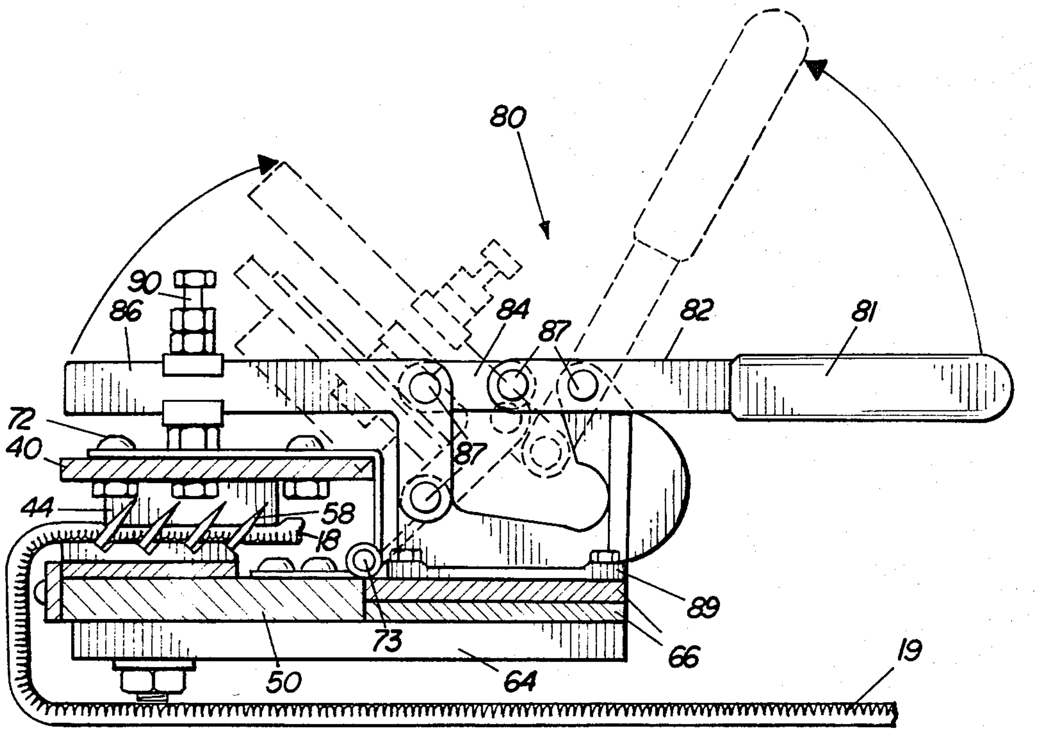
FIG. 5 is a side elevational view of the gripping assembly wherein the structure is represented in its open position in broken lines along 5—5 of FIG. 6.
Figure 6:
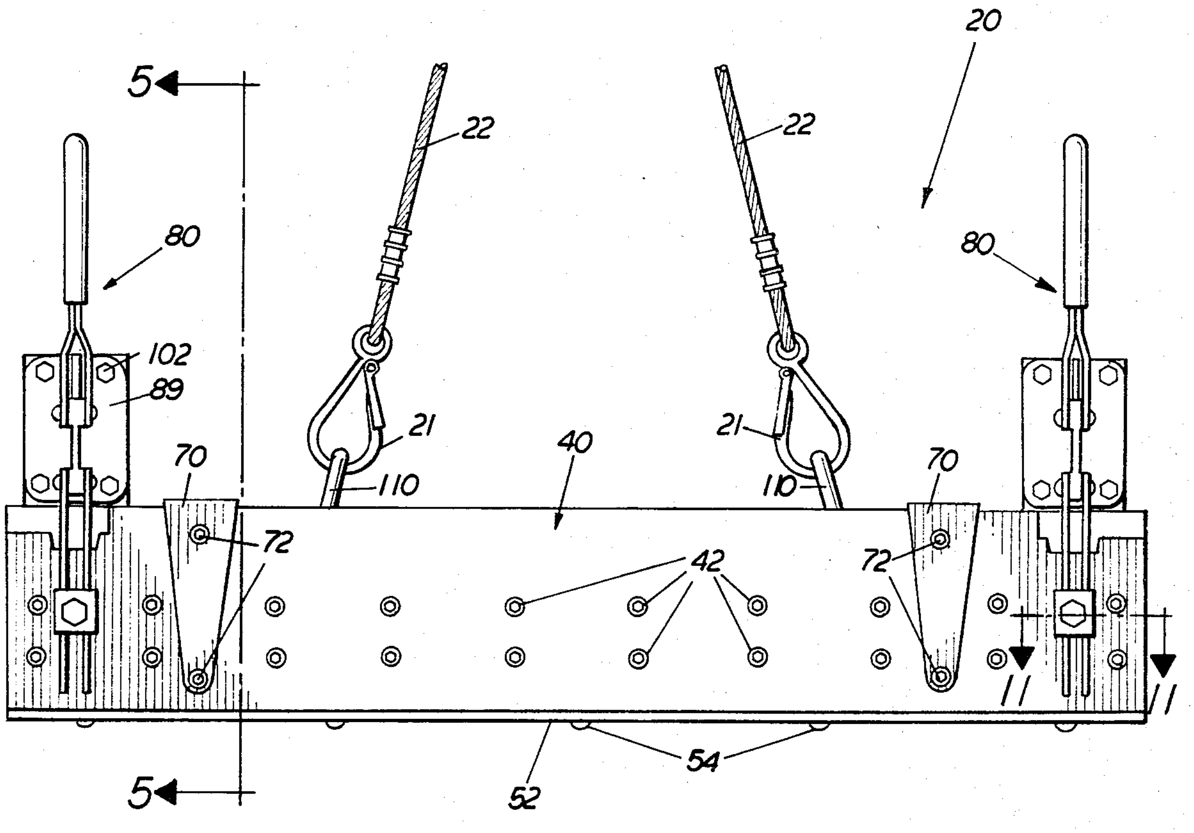
FIG. 6 is a top plan view of the gripping structure of the present invention.
Figure 7:
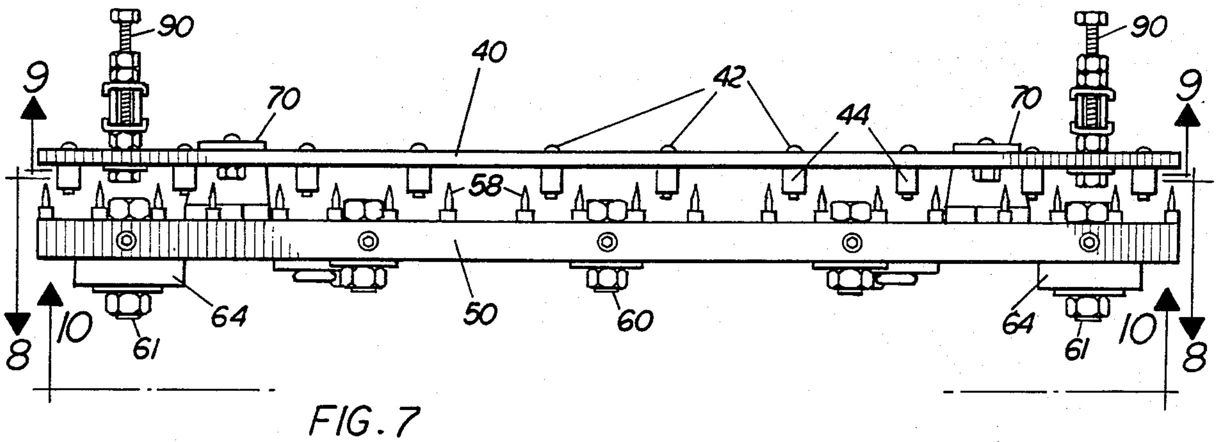
FIG. 7 is a front view of the embodiment of FIG. 6.
Figure 8:
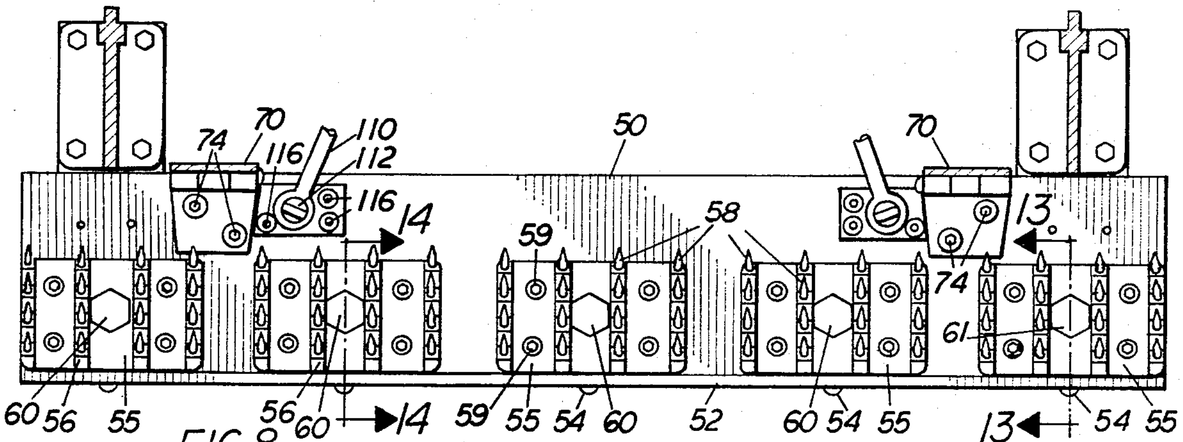
FIG. 8 is a top view along line 8—8 of FIG. 7 showing the structural details of the grasping structure of the present invention.
Figure 9:
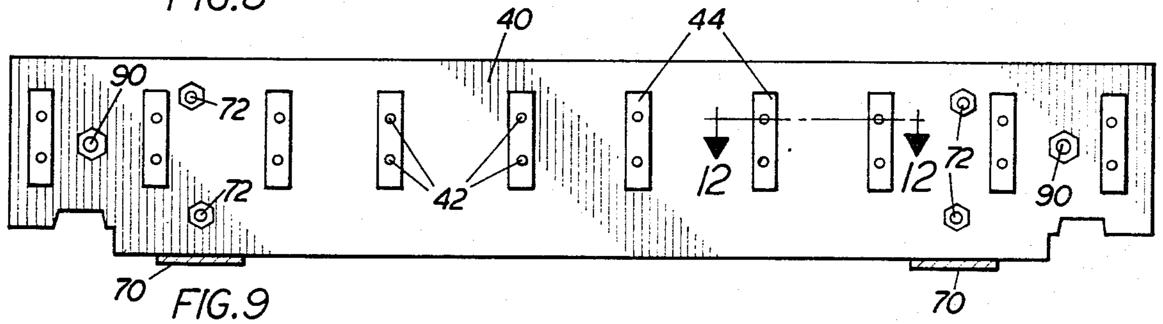
FIG. 9 is a bottom view taken along line 9—9 of FIG. 7 showing structural details of the grasping structure of the present invention.

With regard to FIGS. 1, 2, and 5 through 10, the jaw assembly pictured therein will be described with reference to its function as the gripping jaw assembly. However as stated above, the exact structure may be utilized as the anchor jaw assembly and its detailed structure will not be duplicated for the purposes of brevity. The gripping jaw assembly comprises an upper jaw element 40 and a lower jaw element 50 disposed in cooperative relation to one another and being positioned between an opened and closed position by operation of a locking means generally indicated as 80. With reference to FIG. 5, the closed position is shown in solid lines (also see FIG. 1) and the open position is represented in broken lines. The lower jaw element 50 is secured (FIG. 5) to a mounting platform 64. Similarly, the base 66 of the locking means 80 is secured as at 89 to the rear of this platform 64. The locking means includes a handle portion 81 attached to arm 82 and a positioning portion 86 attached to the upper jaw element 40 by virtue of a screw type clamp connector 90 (see FIGS. 5 and 7). Both the arm 82 and the positioning portion 86 pivot relative to one another about pivot points 87. Accordingly, link member 84 interconnects the positioning arm 86 to the remaining pivot points 87 through the handle arm 82. Manipulation of handle 81 causes pivotal movement of portions 86 relative to arm 82 and the movement of the upper jaw element 40 relative to the lower jaw element 50 between an open and closed position.

It is therefore seen when the gripping jaw assembly 20 is in its closed position, it securely engages an appropriate edge or end 18 of carpet portion 19 to be stripped from a floor to which it is adhered. Relative movement of the upper jaw element 40 to the lower jaw element 50 occurs about a pivot pin 73 (see FIG. 5). A hinge plate 70 is secured to the upper surface of jaw element 40 by connector element 72 and serves to pivot about the pivot pin 73.

With reference to FIGS. 5 and 7 through 10, the carpet edge 18 is secured between the closed jaw elements 40 and 50 through the provision of a plurality of teeth elements 58 arranged in clusters 55 in elongated rows 56. These clusters 55 are secured to the interior surface of jaw element 50 by connector means 59 and a primary bolt 60 extending through the jaw element 50 (See FIGS. 7 and 8). The plurality of teeth 58 and their individual clusters are arranged in spaced relation to one another a predetermined distance so as to adequately grip the entire length of the carpet edge 18 disposed between the jaw elements 40 and 50. To aid in such gripping procedure, a plurality of positioning blocks 44 are secured to the interior surface of jaw element 40 by a plurality of connectors 42. It should be noted that each of the spacer blocks are disposed between individual rows 56 of teeth 58 so as to force carpet portions down therebetween thereby insuring the penetration of the teeth 58 entirely through the backing and the carpet end 18 per se.

Figure 10:
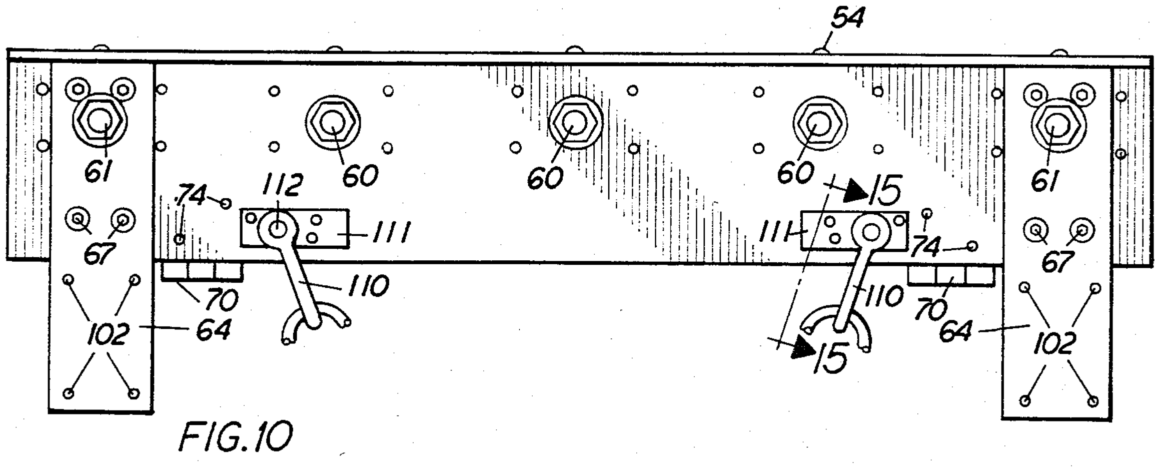
FIG. 10 is a bottom view along line 10—10 of FIG. 7.

With reference to FIG. 10, the undersurface of the jaw element 50 is shown wherein support platform 64 is secured thereto by primary bolt 61 and individual connectors 67. Similarly, connectors 102 serve to secure the support platform 64 to the base 89 of the locking means generally indicated as 80 and described above.

In order to exert the proper pulling force on the carpet portion to be stripped, each of the connecting links 110 is secured to the jaw element 50 by a through bolt 112 about which the connecting link 110 may pivot. Washer elements 111 are provided as shown. To each of the connecting links 110 is connected an attachment cable 22 having opposite ends including a snap hook 21 for engagement of the connecting hooks 110. The attachment cable 22 in turn is secured to an interconnecting means in the form of interconnecting cable 26. The distal end of interconnecting cable 26 is attached as at yoke link 24 wherein its opposite end is attached about the winch drum 28 of the driving means generally indicated as 30. Accordingly, upon activation of the winch motor 29, the interconnecting cable 26 will be forced to reel about the drum 28 thereby exerting a pulling force on the gripping means or the gripping jaw assembly 20. In order to maintain such required pulling force, an anchor means generally indicated as 25 is secured to the anchor plate 35 in order to maintain the driving means or winch assembly in its desired and intended location.

As stated above, the anchor means 25 may, in the preferred embodiment, take the duplicate construction of the gripping jaw assembly. Accordingly, the anchor means 25 may be defined at least in part by an anchor jaw assembly having the same structural features as the gripping jaw assembly. Such anchor jaw assembly may be attached fixedly to the anchor plate 35 and thereby grip an adjacently positioned carpet portion 19' or otherwise be attached by a connecting cable 27 as shown in FIG. 4.

An important structural feature of the driving means includes the pivotal or rotatable connection of the support platform 33 to the anchor platform 35. This is accomplished by virtue of a pivot connection 32 located on the opposite side of the gripping jaw assembly or gripping means 20 relative to the winch drum 28. Also, it is preferred that this pivot be substantially aligned with the center of the winch drum and, as much as possible, in alignment with the direction of force or in alignment with the interconnecting cable 26 since most of the stress will be placed directly along this alignment.

It should be noted that while the anchor means has been described in the preferred embodiment as being at least partially defined by an anchor jaw assembly, other anchor means will be adapted in order to secure the anchor plate 35 in a predetermined and desired position relative to the pulling force exerted on the edge 18 of the carpet 19 to be removed. It is also important to note that the direction of force applied against the carpet being removed is generally in alignment and sufficiently low enough to accomplish maximum efficiency when the carpet is stripped from the floor. Therefore, the winch drum 28 is positioned in cooperation with the interconnecting cable 26 to exert a pulling force substantially in a line which is substantially parallel to the surface of the carpet being stripped.

What is claimed is:

1. A stripper assembly primarily designed to remove carpeting of the type directly adhered to a floor or like surface, said stripper assembly comprising:

(a) gripping means structured for secure attachment to a portion of a carpet being stripped and comprising a jaw assembly including a first jaw element and a second jaw element cooperatively positioned to engage a carpet portion therebetween in secured relation to said gripping mens, (b) driving means connected in substantially driving relation to said gripping means and structured to displace said gripping means and secured carpet portion upon activation of said driving means, (c) anchor means connected to said driving means and structured for secured positioning of said driving means in a spaced location relative to said gripping means and secured carpet portion, (d) said jaw assembly interconnected to said driving means to move with said second carpet portion towards said driving means upon activation thereof and further comprising grasping means mounted between said first and said second jaw elements and structured to securely engage a carpet portion therebetween, (e) said grasping means comprising a plurality of teeth disposed to extend upwardly from an inner surface of at least one jaw element, said teeth configured to penetrate the secured carpet portion between said jaw elements, and (f) said grasping means further comprising a plurality of positioning blocks disposed and configured to force the secured carpet portion into abutting engagement with the plurality of teeth so as to be penetrated thereby.

2. A stripper assembly as in claim 1 further comprising interconnecting means disposed at least between said driving means and said gripping means, said interconnecting means connected at one point along its length to said gripping means and attached in driven relation to said driving means in spaced relation to said gripping means, said interconnecting means and said driving means structured to force said secured carpet portion from said floor and substantially towards said driving means when the latter is activated.

3. A stripper assembly as in claim 2 wherein said interconnecting means comprises a cable structure secured to said gripping means adjacent one end thereof and attached in retractable relation to said driving means spaced distance from said gripping means and secured portion of the carpet, said cable structure and driving means cooperatively structured and disposed to retract said cable structure and pull the secured carpet portion from the floor and towards the driving means.

4. A stripper assembly as in claim 3 wherein said driving means comprises a winch assembly attached in driving relation to said cable structure and disposed to pull said gripping mens towards said driving means and the secured carpet from the floor, upon winding of said cable structure upon said winch assembly.

5. A stripper assembly as in claim 1 wherein said jaw assembly further comprises locking means connected to at least one of said jaw elements and structured to movably position said one jaw element between an open and a closed position relative to the other of said jaw elements.

6. A stipper assembly as in claim 5 wherein said locking means comprises at least one clamp assembly including a handle portion and positioning portion pivotally connected to one another by a hinge means and movable between an open and a closed position, said positioning portion attached to said one jaw element and structured for positioning thereof between an opened and a closed position relative to said other jaw element.

7. A stripper assembly as in claim 6 wherein said closed position is defined by said handle portion and said positioning portion disposed in substantially aligned, linear relation to one another and to said hinge means; said locking means comprising two clamp assemblies both connected to said one jaw element so as to be positioned between an opened and a closed position.

8. A stripper assembly as in claim 1 wherein said anchor means comprises an anchor jaw assembly connected to said driving means and structured to engage a carpet portion and further disposed to maintain said driving means in a substantially secured position relative to said gripping means and the forced path thereof upon activation of said driving means.

9. A stripper assembly as in claim 8 wherein said anchor jaw assembly comprises a first jaw element and a second jaw element cooperatively positioned to engage a carpet portion therebetween in secured relation to said gripping means; an anchor grasping means mounted between said first and said second anchor jaw element and structured to securely engage a carpet portion therebetween when said anchor jaw elements are disposed in a closed position about the secured carpet portion.

10. A stripper assembly as in claim 1 wherein said driving means includes an anchor platform mounted adjacent the surface of the carpet being removed, a support platform rotationally mounted on said anchor platform for positioning of said driving means in substantially aligned relation relative to the direction of travel of said gripping means towards said driving means.

11. A stripper assembly as in claim 10 wherein said driving means comprises a winch structure including a winch drum, said support platform including a pivot axis about which it rotates relative to said anchor platform, said pivot axis disposed behind said winch drum relative to said connected gripping means and in substantially aligned relation to the central transverse axis thereof.

12. A stripper assembly as in claim 10 wherein said anchor means is connected to said driving means in spaced apart relation thereto and further includes an interconnecting cable extending between the anchored disposition of said anchor means and said driving means.

13. A stripper assembly as in claim 10 wherein said anchor means is attached to said driving means and disposed adjacent one end thereof opposite to the disposition of said gripping means.

14. A stripper assembly as in claim 13 wherein said anchor means comprises an anchor jaw assembly connected to said driving means and structured to engage a predetermined carpet portion and further disposed to maintain said driving means at a substantially fixed location relative to said gripping means and the forced path thereof upon activation of said driving means.

* * * * *